(12) United States Patent
Komori

(10) Patent No.: US 11,198,784 B2
(45) Date of Patent: Dec. 14, 2021

(54) RESIN COMPOSITION

(71) Applicant: Sumitomo Chemical Company, Limited, Tokyo (JP)

(72) Inventor: Kazuhiro Komori, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 300 days.

(21) Appl. No.: 16/097,655

(22) PCT Filed: May 1, 2017

(86) PCT No.: PCT/JP2017/017135
§ 371 (c)(1),
(2) Date: Oct. 30, 2018

(87) PCT Pub. No.: WO2017/191828
PCT Pub. Date: Nov. 9, 2017

(65) Prior Publication Data
US 2019/0161608 A1  May 30, 2019

(30) Foreign Application Priority Data

May 2, 2016  (JP) .............................. JP2016-092526

(51) Int. Cl.
*C08L 67/00*  (2006.01)
*C08K 7/02*  (2006.01)
(Continued)

(52) U.S. Cl.
CPC ............... *C08L 67/00* (2013.01); *B29B 7/90* (2013.01); *B29C 45/0001* (2013.01); *C08K 3/04* (2013.01);
(Continued)

(58) Field of Classification Search
None
See application file for complete search history.

(56) References Cited

U.S. PATENT DOCUMENTS 5,086,105 A * 2/1992 Abe ..................... C08G 65/485
524/262
5,149,731 A * 9/1992 Uota ....................... C08L 81/02
523/213
(Continued)

FOREIGN PATENT DOCUMENTS

CN  1432048 A  7/2003
CN  101410459 A  4/2009
(Continued)

OTHER PUBLICATIONS

Koide, "Liquid Crystalline Polymer-Synthesis, Molding, Applications," CMC, p. 95 (Jun. 5, 1987) (partial English translation).
(Continued)

*Primary Examiner* — Vivian Chen
(74) *Attorney, Agent, or Firm* — Panitch Schwarze Belisario & Nadel LLP

(57) ABSTRACT

A resin composition is provided which includes a resin component, a fibrous filler, and a plate-like filler. With respect to 100 parts by mass of the resin component, the content of the fibrous filler is from 30 parts by mass or more to 100 parts by mass or less, the content of the plate-like filler is from 20 parts by mass or more to 80 parts by mass or less, and the total content of the fibrous filler and the plate-like filler is from 50 parts by mass or more to 180 parts by mass or less. The resin component includes an amorphous resin, and the content of the amorphous resin is from 60 parts by mass or more to 100 parts by mass or less.

6 Claims, 4 Drawing Sheets

(51) Int. Cl.
*C08L 101/12* (2006.01)
*C08K 7/00* (2006.01)
*B29B 7/90* (2006.01)
*B29C 45/00* (2006.01)
*C08K 3/04* (2006.01)
*C08K 3/34* (2006.01)
*C08K 3/40* (2006.01)
*C08K 7/06* (2006.01)
*C08K 7/14* (2006.01)
*C08K 3/013* (2018.01)
*B29K 67/00* (2006.01)
*B29K 471/00* (2006.01)
*B29K 479/00* (2006.01)
*B29K 481/00* (2006.01)
*B29K 507/04* (2006.01)
*B29K 509/08* (2006.01)

(52) U.S. Cl.
CPC .............. *C08K 3/34* (2013.01); *C08K 3/40* (2013.01); *C08K 7/00* (2013.01); *C08K 7/02* (2013.01); *C08K 7/06* (2013.01); *C08K 7/14* (2013.01); *C08L 101/12* (2013.01); *B29C 45/00* (2013.01); *B29C 45/0025* (2013.01); *B29C 2945/76103* (2013.01); *B29K 2067/00* (2013.01); *B29K 2471/00* (2013.01); *B29K 2479/08* (2013.01); *B29K 2481/06* (2013.01); *B29K 2507/04* (2013.01); *B29K 2509/08* (2013.01); *C08K 3/013* (2018.01); *C08L 2205/14* (2013.01); *C08L 2205/16* (2013.01); *C08L 2666/54* (2013.01)

(56) References Cited

U.S. PATENT DOCUMENTS

| | | | | |
|---|---|---|---|---|
| 5,308,913 | A * | 5/1994 | Asai | A47J 36/027 524/444 |
| 5,428,100 | A * | 6/1995 | Asai | C08K 3/04 252/511 |
| 5,496,885 | A * | 3/1996 | Takagi | C08L 51/04 524/539 |
| 5,498,689 | A * | 3/1996 | Furuta | C08L 67/00 525/397 |
| 5,804,634 | A * | 9/1998 | Umetsu | C08L 67/00 524/466 |
| 6,375,863 | B1 * | 4/2002 | Tachikawa | C08L 25/06 252/299.01 |
| 6,433,071 | B1 * | 8/2002 | Arai | C08L 81/06 257/E23.005 |
| 7,205,354 | B2 | 4/2007 | Kobayashi | C08L 71/12 359/896 |
| 2002/0132108 | A1 * | 9/2002 | Ikegawa | H05K 1/0373 428/323 |
| 2003/0001139 | A1 | 1/2003 | Nagano et al. | |
| 2003/0050374 | A1 * | 3/2003 | Kamo | C08L 71/126 524/394 |
| 2003/0181560 | A1 * | 9/2003 | Kawaguchi | B32B 15/08 524/424 |
| 2004/0024106 | A1 | 2/2004 | Kim | |
| 2006/0194070 | A1 * | 8/2006 | Croll | C08J 5/18 428/473.5 |
| 2006/0229428 | A1 * | 10/2006 | Shaikh | C08G 63/547 528/272 |
| 2007/0142569 | A1 * | 6/2007 | Donovan | C08L 2666/02 525/419 |
| 2008/0081867 | A1 * | 4/2008 | Sakata | C08L 71/123 524/451 |
| 2009/0253844 | A1 * | 10/2009 | Akiyama | C08L 71/12 524/413 |
| 2009/0294729 | A1 * | 12/2009 | Harada | C09K 19/3809 252/299.01 |
| 2010/0323185 | A1 * | 12/2010 | Hala | C08L 77/00 428/323 |
| 2011/0114884 | A1 * | 5/2011 | Fukuhara | C08K 3/013 252/299.6 |
| 2011/0166269 | A1 * | 7/2011 | Kondo | C08L 71/12 524/251 |
| 2011/0210290 | A1 * | 9/2011 | Harada | C08L 67/00 252/299.6 |
| 2012/0217678 | A1 * | 8/2012 | Komatsu | C08J 3/203 264/328.1 |
| 2012/0235090 | A1 * | 9/2012 | Maeda | B29B 7/845 252/299.6 |
| 2012/0235092 | A1 * | 9/2012 | Sekimura | C08L 67/00 252/299.64 |
| 2013/0082206 | A1 * | 4/2013 | Fukuhara | H05K 7/1053 252/299.5 |
| 2013/0143998 | A1 * | 6/2013 | Tanaka | C08L 25/02 524/496 |
| 2013/0260125 | A1 * | 10/2013 | Ordonez | C08G 73/1071 428/220 |
| 2015/0057373 | A1 | 2/2015 | Stanton et al. | |
| 2015/0057393 | A1 | 2/2015 | Moon et al. | |
| 2015/0073068 | A1 | 3/2015 | Komatsu et al. | |
| 2015/0353827 | A1 * | 12/2015 | Hegi | C09K 19/54 252/299.01 |
| 2016/0053117 | A1 * | 2/2016 | Nair | C08G 73/1071 525/425 |
| 2016/0053118 | A1 * | 2/2016 | Nair | C08L 79/08 525/419 |
| 2016/0244588 | A1 * | 8/2016 | Kotaka | C09K 19/3809 |
| 2018/0362848 | A1 * | 12/2018 | Kim | C08G 63/605 |
| 2020/0115546 | A1 * | 4/2020 | Hara | C08K 3/346 |

FOREIGN PATENT DOCUMENTS

| | | |
|---|---|---|
| CN | 102304284 A | 1/2012 |
| CN | 104419156 A | 3/2015 |
| JP | 2002-020622 A * | 1/2002 |
| JP | 3303697 B2 | 7/2002 |
| JP | 2004-315776 A | 11/2004 |
| JP | 2008-007758 A | 1/2008 |
| JP | 2012-193343 A | 10/2012 |
| JP | 2013-194165 A | 9/2013 |
| JP | 2013-209622 A | 10/2013 |
| JP | 2015-067726 A | 4/2015 |
| JP | 2016-173052 A | 9/2016 |

OTHER PUBLICATIONS

Int'l Search Report dated Jul. 4, 2017 in Int'l Application No. PCT/JP2017/017135.
Office Action dated Feb. 6, 2018 in JP Application No. 2017-558042.
Extended European Search Report dated Nov. 22, 2019 in EP Application No. 17792760.5.
Office Action dated Apr. 17, 2020 in CN Application No. 201780026092.2 (with English Machine Translation).

* cited by examiner

RESIN COMPOSITION

CROSS-REFERENCE TO RELATED APPLICATIONS

This application is a Section 371 of International Application No. PCT/JP2017/017135, filed May 1, 2017, which was published in the Japanese language on Nov. 9, 2017 under International Publication No. WO 2017/191828 A1, which claims priority under 35 U.S.C. § 119(b) to Japanese Patent Application No. 2016-092526, filed on May 2, 2016, the disclosures of which are incorporated herein by reference in their entireties.

BACKGROUND ART

Conventionally, a plastic-containing composition (hereinafter referred to as a resin composition) is suitably used as a molding material in various application fields such as electrical and electronic components, automobile parts and miscellaneous goods. For example, a resin composition containing a polysulfone and a liquid crystalline polyester has been studied as an excellent resin material exhibiting both heat resistance, mechanical properties and chemical resistance exhibited by the polysulfone and heat resistance and high fluidity exhibited by the liquid crystalline polyester.

For example, Patent Document 1 describes a resin composition for a sliding member which is obtained by blending 0 to 150 parts by weight of a crystalline resin having a melting point of 200° C. or higher, 5 to 100 parts by weight of scaly graphite having an average particle diameter of 5 to 100 μm and 1 to 200 parts by weight of a particulate filler having an average particle diameter of 5 to 100 to with respect to 100 parts by weight of an amorphous resin having a glass transition temperature of 140° C. or higher.

Further, Patent Document 2 describes a resin composition for a sliding member which contains an amorphous resin, scaly graphite and a carbon fiber, wherein the content of the scaly graphite is from 5 to 40 parts by mass with respect to 100 parts by mass of the amorphous resin, and the content of the carbon fiber is from 5 to 60 parts by mass with respect to 100 parts by mass of the amorphous resin.

Molded bodies that are molded using these resin compositions are characterized by low molding shrinkage rate and excellent dimensional accuracy.

CITATION LIST

Patent Documents

[Patent Document 1] Japanese Patent No. 3303697
[Patent Document 2] Japanese Unexamined Patent Application, First Publication No. 2015-67726

SUMMARY OF INVENTION

Technical Problem

In recent years, demands for weight reduction and cost reduction have been increasing more and more in the use of various mechanical parts. In particular, various mechanical members for automobile parts are required to have excellent dimensional stability.

The resin compositions described in Patent Documents 1 and 2 still have room for improvement in order to achieve even higher dimensional accuracy.

The present invention has been made in view of the above circumstances, and has an object of providing a resin composition which is excellent in dimensional accuracy when a molded body is formed, and in particular, when the molded body has a cylindrical portion, is excellent in roundness of the cylindrical portion thereof.

Solution to Problem

[1] The present invention is a resin composition containing a resin component, a fibrous filler, and a plate-like filler, wherein a content of the aforementioned fibrous filler is from 30 parts by mass or more to 100 parts by mass or less with respect to 100 parts by mass of the aforementioned resin component, a content of the aforementioned plate-like filler is from 20 parts by mass or more to 80 parts by mass or less with respect to 100 parts by mass of the aforementioned resin component, a total content of the aforementioned fibrous filler and the aforementioned plate-like filler is from 50 parts by mass or more to 180 parts by mass or less with respect to 100 parts by mass of the aforementioned resin component, the aforementioned resin component includes an amorphous resin, and a content of the aforementioned amorphous resin is from 60 parts by mass or more to 100 parts by mass or less with respect to 100 parts by mass of the aforementioned resin component.

[2] The present invention is the resin composition according to [1], wherein when a molded body is formed using a mold cavity having a cavity of 64 mm (MD)×64 mm (TD)×3 mm (thickness), a TD molding shrinkage rate obtained from the following formula (1) is 0.23% or less, an MD molding shrinkage rate obtained from the following formula (2) is 0.15% or less, and (the aforementioned TD molding shrinkage rate)/(the aforementioned MD molding shrinkage rate) is 1.5 or less:

$$TD \text{ molding shrinkage rate } (\%) = ([\text{average value of lengths of two sides in } TD \text{ of the cavity of the mold cavity}] - [\text{average value of lengths of two sides in } TD \text{ of the molded body}])/[\text{average value of lengths of two sides in } TD \text{ of the cavity of the mold cavity}] \times 100 \quad (1)$$

$$MD \text{ molding shrinkage rate } (\%) = ([\text{average value of lengths of two sides in } MD \text{ of the cavity of the mold cavity}] - [\text{average value of lengths of two sides in } MD \text{ of the molded body}])/[\text{average value of lengths of two sides in } MD \text{ of the cavity of the mold cavity}] \times 100 \quad (2).$$

[3] The present invention is the resin composition according to [2], wherein the aforementioned (TD shrinkage rate)/(MD shrinkage rate) is 1.0 or less.

[4] The present invention is the resin composition according to [1], wherein when a molded body is formed using a mold cavity under the following conditions, a TD molding shrinkage rate obtained from the following formula (3) is from 0.02% or more to 0.20% or less, an MD molding shrinkage rate obtained from the following formula (4) is from −0.05% or more to 0.05% or less, a sum of the aforementioned MD molding shrinkage rate and the aforementioned TD molding shrinkage rate is 0.25% or less:

(conditions) mold cavity: includes, in a base substance of 64 mm (MD)×64 mm (TD)×3 mm (thickness), a cavity having a shape in which four square pyramids are attached so that apexes overlap corners of an imaginary square of 50 mm×50 mm in plan view which are assumed to be 7 mm inside from an outer periphery of the aforementioned base substance;

the aforementioned square pyramid: 2 mm×2 min (bottom surface), 0.2 mm (height)

TD molding shrinkage rate (%)=([average value of two lengths between apexes of two square pyramids spaced apart in TD of the mold cavity]− [average value of two lengths between apexes of two square pyramids spaced apart in TD of the molded body])/[average value of two lengths between apexes of two square pyramids spaced apart in TD of the mold cavity]×100    (3)

MD molding shrinkage rate (%)=([average value of two lengths between apexes of two square pyramids spaced apart in MD of the mold cavity]− [average value of two lengths between apexes of two square pyramids spaced apart in MD of the molded body])/[average value of two lengths between apexes of two square pyramids spaced apart in MD of the mold cavity]×100    (4).

[5] The present invention is the resin composition according to [4], wherein the aforementioned (TD shrinkage rate)+ (MD shrinkage rate) is 0.15% or less.

[6] The present invention is the resin composition according to any one of [1] to [5], wherein the aforementioned resin component contains a liquid crystal resin.

[7] The present invention is the resin composition according to any one of [1] to [6], wherein the aforementioned fibrous filler is a carbon fiber or a glass fiber.

[8] The present invention is the resin composition according to any one of [1] to [7], wherein a content of a carbon fiber is from 30 parts by mass or more to 80 parts by mass or less with respect to 100 parts by mass of the resin component, and a total content of the fibrous filler and the plate-like filler is from 50 parts by mass or more to 120 parts by mass or less with respect to 100 parts by mass of the resin component.

[9] The present invention is the resin composition according to any one of [1] to [7], wherein a content of a glass fiber is from 40 parts by mass or more to 100 parts by mass or less with respect to 100 parts by mass of the resin component, and a total content of the fibrous filler and the plate-like filler is from 50 parts by mass or more to 140 parts by mass or less with respect to 100 parts by mass of the resin component.

[10] The present invention is the resin composition according to any one of [1] to [9], wherein the aforementioned amorphous resin has a glass transition temperature of 160° C. or higher.

[11] The present invention is the resin composition according to any one of [1] to [10], wherein the aforementioned amorphous resin is at least one amorphous resin selected from the group consisting of polyether sulfones, polyetherimides, polysulfones, polyarylates and modified polyphenylene ethers.

[12] The present invention is the resin composition according to [6], wherein the aforementioned liquid crystal resin is a liquid crystal polyester.

[13] The present invention is the resin composition according to any one of [1] to [12], wherein the aforementioned plate-like filler is at least one plate-like filler selected from the group consisting of scaly graphite, talc and mica.

[14] The present invention is the resin composition according to any one of [1] to [13], which is for molding an automobile part.

[15] The present invention is an oil control valve, a solenoid valve, a car air conditioning vane or a turbocharger casing/shroud formed from the resin composition according to any one of [1] to [14].

Advantageous Effects of Invention

According to the present invention, it is possible to provide a resin composition which is excellent in dimensional accuracy when a molded body is formed, and in particular, when the molded body has a cylindrical portion, is excellent in roundness of the cylindrical portion thereof.

DESCRIPTION OF EMBODIMENTS

First Embodiment

Figure 1:
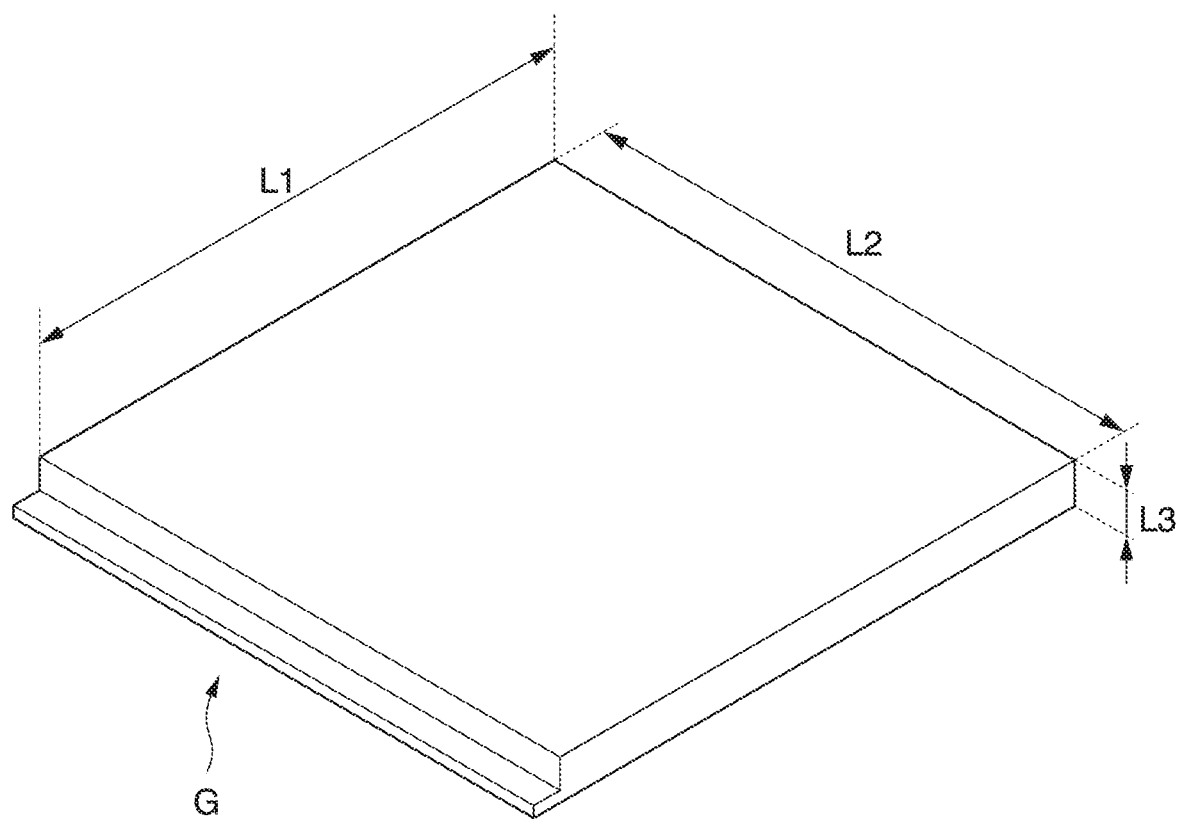
FIG. 1 is a diagram showing a molded body for measuring a shrinkage rate of a molded body formed using a resin composition of the present invention.

One aspect of the resin composition of the present invention is a resin composition containing a resin component, a fibrous filler and a plate-like filler, wherein a content of the aforementioned fibrous filler is 30 parts by mass or more and 100 parts by mass or less with respect to 100 parts by mass of the aforementioned resin component, a content of the aforementioned plate-like filler is 20 parts by mass or more and 80 parts by mass or less with respect to 100 parts by mass of the aforementioned resin component, a total content of the aforementioned fibrous filler and the aforementioned plate-like filler is 50 parts by mass or more and 180 parts by mass or less with respect to 100 parts by mass of the aforementioned resin component, the aforementioned resin component includes an amorphous resin, and a content of the aforementioned amorphous resin is 60 parts by mass or more and 100 parts by mass or less with respect to 100 parts by mass of the aforementioned resin component.

The resin composition of the present embodiment is characterized by containing a resin component containing an amorphous resin, a fibrous filler and a plate-like filler in a specific ratio.

When forming a molded body from the resin composition, a molding shrinkage rate in MD (that is, machine direction: flow direction at the time of molding) of the molded body (sometimes referred to as MD shrinkage rate) tends to decrease, and a molding shrinkage rate in TD (that is, transverse direction: direction perpendicular to the flow direction at the time of molding) of the molded body (sometimes referred to as TD shrinkage rate) tends to increase. For this reason, the value of (TD shrinkage rate)/ (MD shrinkage rate) tends to increase.

Here, a component having a cylindrical shape represented by, for example, an oil control valve is required to have high dimensional accuracy in order to reduce the roundness and irregularity of a cylindrical portion. When an oil control valve is manufactured using a resin composition having a large value of (TD shrinkage rate)/(MD shrinkage rate) when a molded body is formed, there are problems in that the dimensional accuracy is insufficient, the roundness of the cylindrical portion deteriorates, and the irregularity become large.

In the present embodiment, by forming a resin composition containing a resin component containing an amorphous resin, a fibrous filler and a plate-like filler in a specific ratio, the value of (TD shrinkage rate)/(MD shrinkage rate) when a molded body is formed can be reduced. As a result, since the dimensional accuracy of the molded body can be increased, it can be suitably used particularly for the production of automobile parts such as oil control valves which require a high degree of roundness.

A specific description of the resin composition of the present embodiment will be described later.

Second Embodiment

Another aspect of the resin composition according to the present invention is a resin composition wherein when a molded body is formed using a mold cavity having a cavity of 64 mm (length in MD)×64 mm (length in TD)×3 mm (thickness), a TD molding shrinkage rate (hereinafter sometimes referred to as "TD shrinkage rate") obtained from the following formula (1) is 0.23% or less, and preferably −0.04% or more, an MD molding shrinkage rate (hereinafter sometimes referred to as "MD shrinkage rate") obtained from the following formula (2) is 0.15% or less, and preferably 0.01% or more, and (the TD shrinkage rate)/(the MD shrinkage rate) is 1.5 or less, and preferably −5.0 or more.

Further, as another aspect, the TD molding shrinkage rate may be from −0.025 to 0.116%. The value of (TD shrinkage rate)/(MD shrinkage rate) may be from −0.66 to 1.33.

$TD$ molding shrinkage rate (%)=([average value of lengths of two sides in $TD$ of the cavity of the mold cavity]−[average value of lengths of two sides in $TD$ of the molded body])/[average value of lengths of two sides in $TD$ of the cavity of the mold cavity]×100     (1)

$MD$ molding shrinkage rate (%)=([average value of lengths of two sides in $MD$ of the cavity of the mold cavity]−[average value of lengths of two sides in $MD$ of the molded body])/[average value of lengths of two sides in $MD$ of the cavity of the mold cavity]×100     (2)

More specifically, the present embodiment will be described with reference to FIG. 1.

FIG. 1 shows an example of a molded body formed from the resin composition. In FIG. 1, G denotes a gate portion which is a film gate, L1 denotes a side in the MD, L2 denotes a side in the TD, and L3 denotes the thickness of the molded body.

For example, when a molded body is manufactured using a mold cavity having a cavity of L1: 64 mm, L2: 64 mm, L3: 3 mm, the length of L1 (an average value of the lengths of two sides, that is, L1 and an opposite side of L1 in FIG. 1, in other words, an average value of the lengths of two sides in the MD of the molded body) is measured, and with a length corresponding to L1 of the mold cavity (that is, an average value of the lengths of two sides in the MD of the cavity of the mold cavity), the MD shrinkage rate is calculated by the following method.

[$MD$ shrinkage rate (%)]=([average value (μm) of lengths of two sides in $MD$ of the cavity of the mold cavity]−[average value (μm) of lengths of two sides in $MD$ of the molded body])/[average value (μm) of lengths of two sides in $MD$ of the cavity of the mold cavity]×100

Similarly, the length of L2 (an average value of the lengths of two sides, that is, L2 and an opposite side of L2 in FIG. 1, in other words, an average value of the lengths of two sides in the TD of the molded body) is measured, and with a length corresponding to L2 of the mold cavity (that is, an average value of the lengths of two sides in the TD of the cavity of the mold cavity), the TD shrinkage rate is calculated by the following method.

[$TD$ shrinkage rate (%)]=([average value (μm) of lengths of two sides in $TD$ of the cavity of the mold cavity]−[average value (μm) of lengths of two sides in $TD$ of the molded body])/[average value (μm) of lengths of two sides in $TD$ of the cavity of the mold cavity]×100

It should be noted that in this specification, the "lengths of two sides in TD" and the "lengths of two sides in MD" are measured with a micrometer (for example, "MDC-75M" manufactured by Mitutoyo Corporation), and the "thickness" is measured with a micrometer (for example, "MD-25M" manufactured by Mitutoyo Corporation).

The MD shrinkage rate calculated by the above method is preferably 0.01% or more and 0.15% or less, and more preferably 0.01% or more and 0.10% or less. In addition, the TD shrinkage rate is preferably −0.04% or more and 0.23% or less, and more preferably −0.04% or more and 0.10% or less.

Furthermore, the value of (TD shrinkage rate)/(MD shrinkage rate) is preferably 1.5 or less, more preferably 1.0 or less, and particularly preferably 0.9 or less. It is also preferably −5.0 or more.

As one aspect, the value of (TD shrinkage rate)/(MD shrinkage rate) is preferably −5.0 or more and 1.5 or less, and more preferably −5.0 or more and 0.9 or less.

If the value of (TD shrinkage rate)/(MD shrinkage rate) exceeds 1.5, the roundness and irregularity of the cylindrical portion tend to decrease, for example, when a molded body having a cylindrical shape such as an oil control valve is formed. On the other hand, if the value of (TD shrinkage rate)/(MD shrinkage rate) is lower than −5.0, molding defects such as short shots may occur. Although the value of (TD shrinkage rate)/(MD shrinkage rate) may be lower than −5.0 when a filler is excessively added, in that case, the fluidity of the resin composition is too low, and there is a possibility of causing molding defects such as short shots.

If the shrinkage rate in the case of forming the molded body is within the above range, when a component having a cylindrical shape is manufactured, for example, the roundness of the cylindrical portion can be increased.

It should be noted that the method of manufacturing a molded body using the mold cavity may be appropriately selected from known methods. For example, a molded body can be obtained by a method of injection molding a pelletized resin composition into the mold cavity using an injection molding machine (for example, "UH-1000" manufactured by Nissei Plastic Industrial Co., Ltd.) at a cylinder temperature of 360 to 380° C., an injection speed of 50 to 120 mm/sec., a holding pressure of 80 to 200 MPa, and a mold temperature of 150° C.

Third Embodiment

Yet another aspect of the resin composition of the present invention is characterized in that when a molded body is formed using a mold cavity of the following conditions, an MD molding shrinkage rate (hereinafter may be referred to as high precision MD shrinkage rate) obtained from the following formula (4) is −0.05% or more and 0.05% or less, a TD molding shrinkage rate (hereinafter may be referred to as high precision TD shrinkage rate) obtained from the following formula (3) is 0.02% or more and 0.20% or less, and the sum of the high precision MD shrinkage rate and the high precision TD shrinkage rate is 0.25% or less.

(conditions)

mold cavity: includes, in a base substance of 64 mm (MD)×64 mm (TD)×3 mm (thickness), a cavity having a shape in which four square pyramids are added so that vertexes overlap, in plan view, corners of an imaginary square of 50 mm×50 mm assumed to be 7 mm inside from an outer periphery of the aforementioned base substance;

the aforementioned square pyramid: 2 mm×2 mm (bottom surface), 0.2 mm (height)

$TD$ molding shrinkage rate (%)=([average value of two lengths between apexes of two square pyramids spaced apart in $TD$ of the mold cavity]−[average value of lengths between apexes of two square pyramids spaced apart in $TD$ of the molded body])/[average value of two lengths between apexes of two square pyramids spaced apart in $TD$ of the mold cavity]×100   (3)

$MD$ molding shrinkage rate (%)=([average value of two lengths between apexes of two square pyramids spaced apart in $MD$ of the mold cavity]−[average value of lengths between apexes of two square pyramids spaced apart in $MD$ of the molded body])/[average value of two lengths between apexes of two square pyramids spaced apart in $MD$ of the mold cavity]×100   (4).

Measurement conditions of molded bodies formed from the resin composition of the present embodiment will be described with reference to the drawings.

Figure 2:
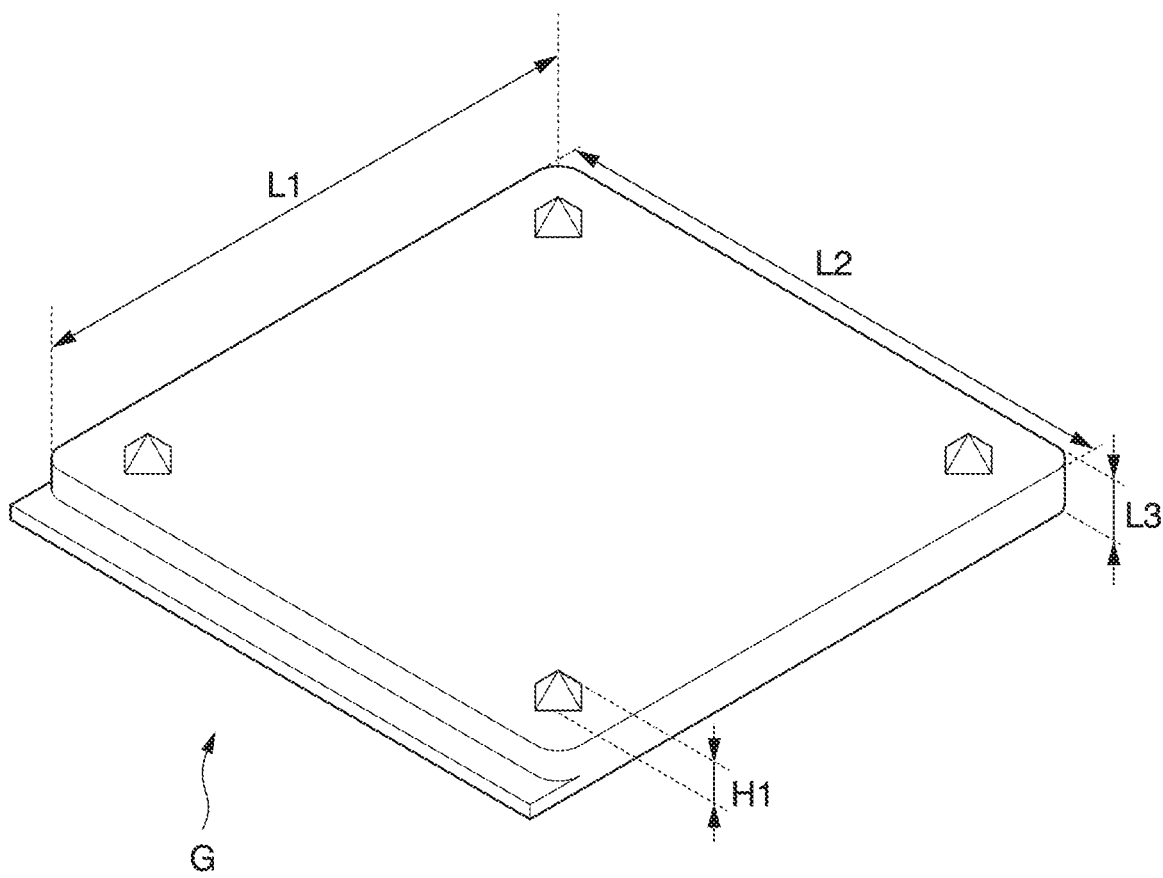
FIG. 2 is a diagram showing a molded body for measuring a shrinkage rate of a molded body formed using the resin composition of the present invention.

FIG. 2 is a perspective view of a molded body formed from the resin composition of the present embodiment. In the molded body, four square pyramids are attached on a flat plate. In FIG. 2, G denotes a gate portion which is a film gate, L1 denotes a side in the MD, L2 denotes a side in the TD, L3 denotes the thickness of the flat plate, and H1 denotes the height of the square pyramid.

The cavity of the mold cavity used in the present embodiment has a base substance portion having L1 of 64 mm, L2 of 64 mm, L3 of 3 mm and H1 of 0.2 mm.

Figure 3:
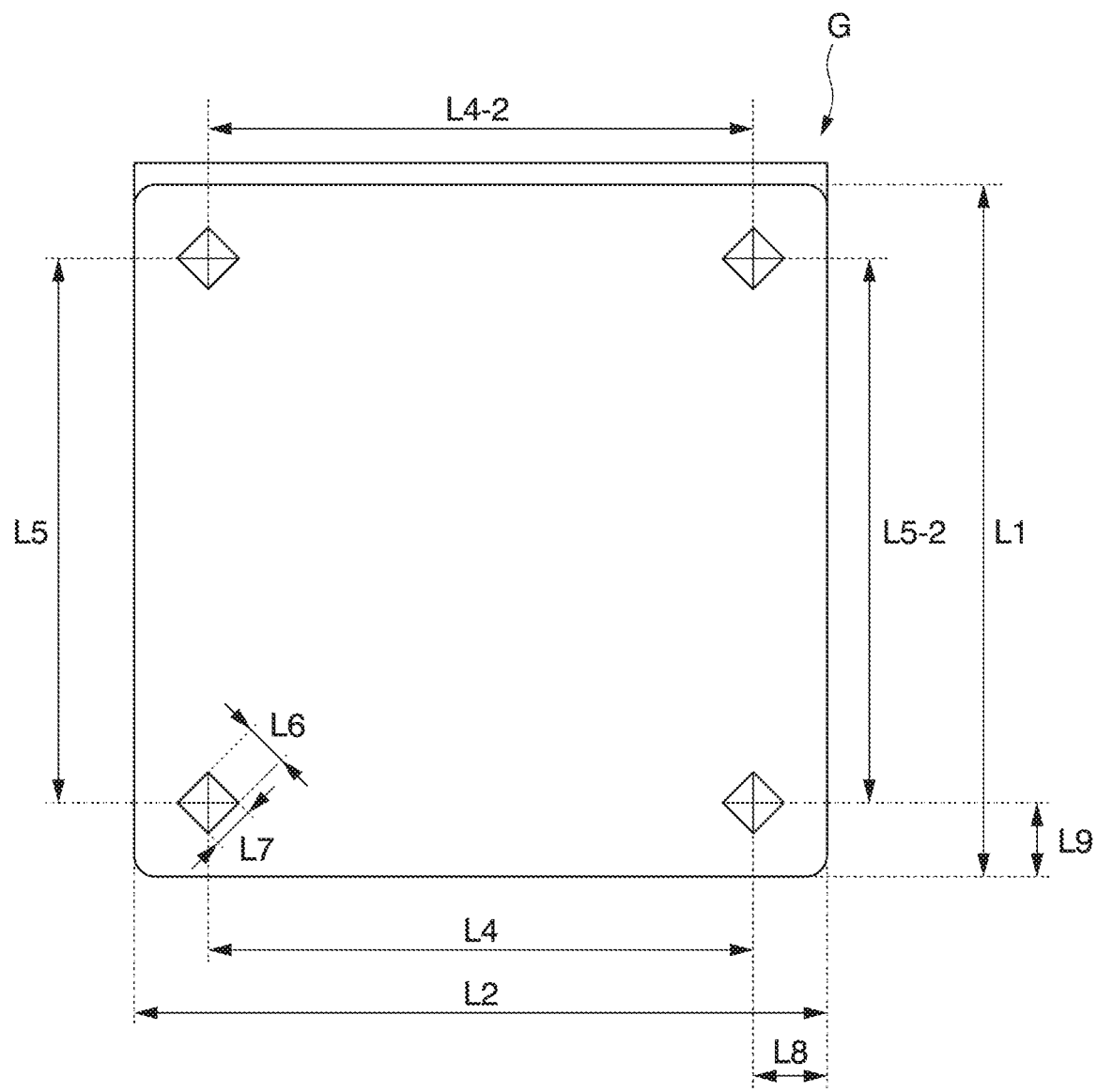
FIG. 3 is a diagram showing a molded body for measuring a shrinkage rate of a molded body formed using the resin composition of the present invention.

FIG. 3 shows a top view of a molded body used for measurement in the present embodiment. The square pyramid has a bottom surface in which L6 and L7 are 2 mm (that is, the bottom surface is a quadrangle of 2 mm×2 m). Four square pyramids are attached so that the apexes overlap the corners of an imaginary square having one side represented by L4 of 50 mm in plan view which are assumed to be 7 mm inside from the outer periphery of the base substance (mold cavity), which is the distance represented by L8 and L9 (in other words, four square pyramids are attached so that the apexes overlap the corners of an imaginary square of 50 mm×50 mm in plan view which are assumed to be 7 mm inside from the outer periphery of the mold cavity). Further, the radius of curvature R of the corner of the base substance is 2 mm.

In the molded body formed from the mold cavity having the above dimensions, with regard to a distance L5 between two square pyramids spaced apart in the MD along the side of the imaginary square, the high precision MD shrinkage rate is defined as a ratio (%) of the difference between an average value of the two lengths between the apexes of the two square pyramids spaced apart in the MD of the mold cavity and an average value of the two lengths between the apexes of the two square pyramids spaced apart in the MD of the molded body formed from the mold cavity, with respect to the average value of the two lengths between the apexes of two square pyramids spaced apart in the MD of the mold cavity (i.e., when two apexes are connected with a straight line, the length of the straight line). Further, in the molded body formed from the mold cavity having the above dimensions, with regard to a distance L4 between two square pyramids spaced apart in the TD along the side of the imaginary square, the high precision TD shrinkage rate is defined as a ratio (%) of the difference between an average value of the two lengths between the apexes of the two square pyramids spaced apart in the TD of the mold cavity and an average value of the two lengths between the apexes of the two square pyramids spaced apart in the TD of the molded body formed from the mold cavity, with respect to the average value of the two lengths between the apexes of two square pyramids spaced apart in the TD of the mold cavity.

More specifically, the length of L5 (an average value of the lengths of two sides of L5 and L5-2, that is, an average value of the lengths of two sides in the MD in the imaginary square of the molded body formed from the mold cavity of the above dimensions) is measured using a three-dimensional shape measuring apparatus, and together with the length corresponding to L5 of the mold cavity (that is, an average value of the lengths of two sides in the MD in the imaginary square of the mold cavity of the above dimensions), the shrinkage rate in the MD is calculated by the following method.

$MD$ molding shrinkage rate (high precision $MD$ shrinkage rate) (%)=([average value of two lengths between the apexes of two square pyramids spaced apart in the $MD$ of the mold cavity]−[average value of two lengths between the apexes of two square pyramids spaced apart in the $MD$ of the molded body])/[average value of two lengths between the apexes of two square pyramids spaced apart in the $MD$ of the mold cavity]×100.

Similarly, the length of L4 (an average value of the lengths of two sides of L4 and L4-2, that is, an average value of the length of two sides in the TD in the imaginary square of the molded body formed from the mold cavity of the above dimensions) is measured using a three-dimensional shape measuring apparatus, and together with the length corresponding to L4 of the mold cavity (that is, an average value of the lengths of two sides of the TD in the imaginary square of the mold cavity of the above dimensions), the shrinkage rate in the TD direction is calculated by the following method.

$TD$ molding shrinkage rate (high precision $TD$ shrinkage rate) (%)=([average value of two lengths between the apexes of two square pyramids spaced apart in the $TD$ of the mold cavity]−[average value of lengths between the apexes of two square pyramids spaced apart in the $TD$ of the molded body])/[average value of two lengths between the apexes of two square pyramids spaced apart in the $TD$ of the mold cavity]×100

The high precision MD shrinkage rate calculated by the above method is from −0.05% or more to 0.05% or less, preferably from −0.05% or more to 0.03% or less, and more preferably from −0.05% or more to 0.00 or less. Further, the high precision TD shrinkage rate is from 0.02% or more to 0.20% or less, preferably from 0.02% or more to 0.15% or less, and more preferably from 0.02% or more to 0.13% or less.

Furthermore, the sum of the high precision TD shrinkage rate and the high precision MD shrinkage rate is preferably from −0.03% or more to 0.25% or less, more preferably from −0.03% or more to 0.18% or less, still more preferably from −0.03% or more to 0.13%, and particularly preferably from −0.03% or more to 0.10% or less.

If the shrinkage rate in the case of forming the molded body is within the above range, when a component having a cylindrical shape is manufactured, for example, the roundness of the cylindrical portion can be increased.

It should be noted that the method of manufacturing a molded body using the mold cavity may be appropriately selected from known methods, and for example, a molded body can be obtained by the same manufacturing method as described above.

Hereinafter, a resin composition of the present invention will be described.

[Resin Component]

A resin composition of the present embodiment contains a resin component. The resin component includes an amorphous resin.

Examples of the amorphous resin include, for example, a polyether sulfone, a polyether imide, a polysulfone, a polyarylate, a modified polyphenylene ether, a polycarbonate, a polyimide, a polyarylate and a polyarylene ether, and two or more of these may be used in combination. Among them, a polyether sulfone, a polyetherimide, a polysulfone, a polyarylate, and a modified polyphenylene ether are preferable in the present embodiment, and a polyether sulfone is particularly preferable. These amorphous resins preferably have an aromatic group in the main chain.

Further, the glass transition temperature of the amorphous resin is preferably from 160° C. or more to 420° C. or less. When the glass transition temperature of the amorphous resin is 160° C. or higher, since the heat resistance of the molded body is improved, for example, it can be suitably applied to components requiring high heat resistance such as parts around the engine of an automobile, and a molded body having high heat resistance can be obtained.

The glass transition temperature is an intermediate point glass transition temperature obtained by differential scanning calorimetry (DSC) according to JIS K 7121: 1987.

Further, from the viewpoint of improving the fluidity of the resin during molding, the resin component preferably contains a liquid crystal resin.

As an example of the liquid crystal resin, a liquid crystal polyester showing liquid crystallinity in a molten state is preferable.

Hereinafter, polyether sulfones will be described as preferable amorphous resins, and liquid crystal polyesters will be described as preferable liquid crystal resins.

(Polyether Sulfone)

Typically, the polyether sulfone used in the present embodiment is a resin having a repeating unit containing a divalent aromatic group (a residue obtained by removing, from an aromatic compound, two hydrogen atoms bonded to its aromatic ring), a sulfonyl group (—SO$_2$—) and an oxygen atom.

From the viewpoints of heat resistance and chemical resistance, the polyether sulfone preferably has a repeating unit represented by the following formula (5) (hereinafter may be referred to as "repeating unit (5)" in some cases). Furthermore, one or more of other repeating units such as a repeating unit represented by the following formula (6) (hereinafter may be referred to as "repeating unit (6)" in some cases) or a repeating unit represented by the following formula (7) (hereinafter may be referred to as "repeating unit (7)" in some cases) may be included.

-Ph$^1$-SO$_2$-Ph$^2$-O—  (5)

(Ph$^1$ and Ph$^2$ each independently represent a phenylene group; and hydrogen atoms in the phenylene group may be each independently substituted with an alkyl group, an aryl group or a halogen atom.)

-Ph$^3$-R-Ph$^4$-O—  (6)

(Ph$^3$ and Ph$^4$ each independently represent a phenylene group; hydrogen atoms in the phenylene group may be each independently substituted with an alkyl group, an aryl group or a halogen atom; and R represents an alkylidene group, an oxygen atom or a sulfur atom.)

-(Ph$^5$)$n$-O—  (7)

(Ph$^5$ represents a phenylene group; hydrogen atoms in the phenylene group may be each independently substituted with an alkyl group, an aryl group or a halogen atom; n represents an integer of 1 to 3; and when n is 2 or more, a plurality of Ph$^5$ groups may be the same as or different from each other.)

The phenylene group represented by any one of Ph$^1$ to Ph$^5$ may be a p-phenylene group, an m-phenylene group or an o-phenylene group, but it is preferably a p-phenylene group from the viewpoint of increasing the heat resistance and strength of the obtained resin.

The alkyl group which may substitute the hydrogen atom in the phenylene group is preferably an alkyl group having 1 to 10 carbon atoms, and examples thereof include a methyl group, an ethyl group, an n-propyl group, an isopropyl group, an n-butyl group, an isobutyl group, an s-butyl group, a t-butyl group, an n-hexyl group, an n-heptyl group, a 2-ethylhexyl group, an n-octyl group, an n-nonyl group and an n-decyl group.

The aryl group which may substitute the hydrogen atom in the phenylene group is preferably an aryl group having 6 to 20 carbon atoms, and examples thereof include a monocyclic aromatic group such as a phenyl group, an o-tolyl group, an m-tolyl group and a p-tolyl group, a condensed aromatic group such as a 1-naphthyl group and a 2-naphthyl group, and the like.

Examples of the halogen atom which may substitute the hydrogen atom in the phenylene group include a fluorine atom, a chlorine atom, a bromine atom and an iodine atom.

In the case where the hydrogen atom in the phenylene group is substituted with these groups, for each of the above phenylene groups, the number of substituents included in the phenylene group is preferably each independently one or two, and more preferably one.

As an example of the alkylidene group represented by R, an alkylidene group having 1 to 5 carbon atoms is preferable, and examples thereof include a methylene group, an ethylidene group, an isopropylidene group, a 1-butylidene group and a 1-pentylidene group.

It should be noted that each of the polyether sulfones used in the present embodiment may independently have two or more of the repeating units (5) to (7). In particular, the polyether sulfone used in the present embodiment preferably includes 50 mol % or more and 100 mol % or less of the repeating unit (5) with respect to the total of all repeating units of the polyether sulfone, more preferably includes 80 mol % or more and 100 mol % or less, and still more preferably includes only the repeating unit (5) (100 mol %) as a repeating unit.

The polyether sulfone used in the present embodiment can be produced by polycondensation of a dihalogenosulfone compound corresponding to a repeating unit constituting the polyether sulfone with a dihydroxy compound.

For example, a resin having the repeating unit (5) can be produced by using a compound represented by the following formula (8) (hereinafter may be referred to as "compound (8)" in some cases) as a dihalogenosulfone compound and using a compound represented by the following formula (9) as a dihydroxy compound.

$$X^1\text{-Ph}^1\text{-SO}_2\text{-Ph}^2\text{-}X^2 \tag{8}$$

($X^1$ and $X^2$ each independently represent a halogen atom; and $Ph^1$ and $Ph^2$ are the same as defined above.)

$$\text{HO-Ph}^1\text{-SO}_2\text{-Ph}^2\text{-OH} \tag{9}$$

($Ph^1$ and $Ph^2$ are the same as defined above.)

Further, a resin having the repeating unit (5) and the repeating unit (6) can be produced by using the compound (8) as a dihalogenosulfone compound and using a compound represented by the following formula (10) as a dihydroxy compound.

$$\text{HO-Ph}^3\text{-R-Ph}^4\text{-OH} \tag{10}$$

($Ph^3$, $Ph^4$ and R are the same as defined above.)

Further, a resin having the repeating unit (5) and the repeating unit (7) can be produced by using the compound (8) as a dihalogenosulfone compound and using a compound represented by the following formula (11) as a dihydroxy compound.

$$\text{HO-(Ph}^5)_n\text{-OH} \tag{11}$$

($Ph^5$ and n are the same as defined above.)

The polycondensation is preferably carried out in a solvent using an alkali metal salt of carbonic acid. The alkali metal salt of carbonic acid may be an alkali carbonate (alkali metal carbonate) which is a normal salt, an alkali bicarbonate (alkali hydrogen carbonate, alkali metal hydrogen carbonate) which is an acid salt, or may be a mixture of both, and as the alkali carbonate, sodium carbonate or potassium carbonate is preferably used, and as the alkali bicarbonate, sodium bicarbonate or potassium bicarbonate is preferably used.

As the solvent used for polycondensation, organic polar solvents such as dimethylsulfoxide, 1-methyl-2-pyrrolidone, sulfolane (1,1-dioxolane), 1,3-dimethyl-2-imidazolidinone, 1,3-diethyl-2-imidazolidinone, dimethylsulfone, diethylsulfone, diisopropylsulfone and diphenylsulfone are preferably used.

The molecular weight of the polyether sulfone is evaluated by using the reduced viscosity as an indicator of the molecular weight. The reduced viscosity value is a value indicating how much the ratio of the viscosity of a solution of a certain concentration and the viscosity of a solvent increases with respect to the viscosity of the original solvent and is a value obtained by dividing the specific viscosity by the concentration of the solute. For the measurement of the reduced viscosity of the polyether sulfone, a 1 w/v % solution obtained by dissolving the polyether sulfone in N,N-dimethylformamide is used. The reduced viscosity of the polyether sulfone is preferably from 0.28 or more to 0.53 or less, more preferably from 0.30 or more to 0.49 or less, and particularly preferably from 0.35 or more to 0.42 or less. The higher the reduced viscosity of the polyether sulfone, the easier it is to improve heat resistance and strength/chemical resistance. On the other hand, if the reduced viscosity is too high, since a high temperature is required at the time of injection molding, thermal degradation is likely to occur during molding, the viscosity at the time of melting becomes high and the fluidity of the molten resin becomes insufficient, and there is a possibility that molding defects such as short shots or the like may occur at the time of forming a molded body having a thin portion. The lower the reduced viscosity, the lower the viscosity at the time of melting, the easier the fluidity is improved, and the easier it becomes to form a molded article having a thin portion. On the other hand, if the reduced viscosity is too low, heat resistance and strength/chemical resistance tend to be lowered. As a result, for example, when a molded article such as an oil control valve used under an environment to be brought into contact with a chemical for a long period of time is formed from a composition containing a polyether sulfone whose reduced viscosity is too low, problems such as a decrease in the strength of the molded article may occur.

(Liquid Crystal Polyester)

The liquid crystal polyester used in the present embodiment has repeating units represented by the following general formulas (1), (2) and (3).

$$-\text{O}-\text{Ar}^1-\text{CO}- \tag{1}$$

$$-\text{CO}-\text{Ar}^2-\text{CO}- \tag{2}$$

$$-\text{X}-\text{Ar}^3-\text{Y}- \tag{3}$$

(In the formula, $Ar^1$ is a phenylene group, a naphthylene group or a biphenylylene group; $Ar^2$ and $Ar^3$ are each independently a phenylene group, a naphthylene group, a biphenylylene group or a group represented by the following general formula (4); X and Y are each independently an oxygen atom or an imino group; and one or more hydrogen atoms in the $Ar^1$, $Ar^2$ and $Ar^3$ groups may be each independently substituted with a halogen atom, an alkyl group or an aryl group.)

$$-\text{Ar}^4-\text{Z}-\text{Ar}^5- \tag{4}$$

(In the formula, $Ar^4$ and $Ar^5$ each independently represent a phenylene group or a naphthylene group; and Z represents an oxygen atom, a sulfur atom, a carbonyl group, a sulfonyl group or an alkylidene group.)

In the above general formulas (1) to (3), examples of the halogen atom substitutable with one or more hydrogen atoms in the group represented by Ar1, Ar2 or Ar3 include a fluorine atom, a chlorine atom, a bromine atom and an iodine atom.

In the above general formulas (1) to (3), the alkyl group which can substitute one or more hydrogen atoms in the group represented by $Ar^1$, $Ar^2$ or $Ar^3$ is preferably an alkyl group having 1 to 10 carbon atoms, and examples thereof include a methyl group, an ethyl group, an n-propyl group, an isopropyl group, an n-butyl group, an isobutyl group, a sec-butyl group, a tert-butyl group, an n-hexyl group, an n-heptyl group, a 2-ethylhexyl group, an n-octyl group, an n-nonyl group and an n-decyl group.

In the above general formulas (1) to (3), the aryl group which can substitute one or more hydrogen atoms in the group represented by $Ar^1$, $Ar^2$ or $Ar^3$ is preferably an aryl group having 6 to 20 carbon atoms, and examples thereof include monocyclic aromatic groups such as a phenyl group, an o-tolyl group, an m-tolyl group and a p-tolyl group, and condensed aromatic groups such as a 1-naphthyl group and a 2-naphthyl group.

In the above general formulas (1) to (3), when one or more hydrogen atoms in the group represented by $Ar^1$, $Ar^2$ or $Ar^3$ are substituted with these groups, the number of substitutions is preferably, each independently, 1 or 2, and more preferably 1 for each of the groups represented by $Ar^1$, $Ar^2$ or $Ar^3$.

In the above general formula (4), the alkylidene group is preferably an alkylidene group having 1 to 10 carbon atoms, and examples thereof include a methylene group, an ethylidene group, an isopropylidene group, an n-butylidene group and a 2-ethylhexylidene group.

As the repeating unit represented by the general formula (1) include those in which $Ar^1$ is a 1,4-phenylene group (that is, a repeating unit derived from p-hydroxybenzoic acid) and those in which $Ar^1$ is a 2,6-naphthylene group (that is, a repeating unit derived from 6-hydroxy-2-naphthoic acid) are preferable, and those in which $Ar^1$ is a 1,4-phenylene group are more preferable.

In the present specification, the expression "derived" means that the chemical structure is changed due to polymerization.

As a monomer forming the repeating unit represented by the general formula (1), 2-hydroxy-6-naphthoic acid, p-hydroxybenzoic acid or 4-(4-hydroxyphenyl) benzoic acid can be mentioned, and monomers in which a hydrogen atom of the benzene ring or the naphthalene ring of these acids is substituted with a halogen atom, an alkyl group having 1 to 10 carbon atoms or an aryl group can also be mentioned. Furthermore, the above-mentioned monomer may be used as an ester-forming derivative to be described later.

As the repeating unit represented by the general formula (2), those in which $Ar^2$ is a 1,4-phenylene group (that is, a repeating unit derived from terephthalic acid), those in which $Ar^2$ is a 1,3-phenylene group (that is, a repeating unit derived from isophthalic acid), those in which $Ar^2$ is a 2,6-naphthylene group (that is, a repeating unit derived from 2,6-naphthalenedicarboxylic acid), and those in which $Ar^2$ is a diphenyl ether-4,4'-diyl group (that is, a repeating unit derived from diphenyl ether-4,4'-dicarboxylic acid) are preferable, and those in which $Ar^2$ is a 1,4-phenylene group and those in which $Ar^2$ is a 1,3-phenylene group are more preferable.

As a monomer forming the repeating unit represented by the general formula (2), 2,6-naphthalene dicarboxylic acid, terephthalic acid, isophthalic acid or biphenyl-4,4'-dicarboxylic acid can be mentioned, and monomers in which a hydrogen atom of the benzene ring or the naphthalene ring of these acids is substituted with a halogen atom, an alkyl group having 1 to 10 carbon atoms or an aryl group can also be mentioned.

Furthermore, the above-mentioned monomer may be used as an ester-forming derivative to be described later.

As the repeating unit represented by the general formula (3), those in which $Ar^3$ is a 1,4-phenylene group (that is, a repeating unit derived from hydroquinone, p-aminophenol or p-phenylenediamine) and those in which $Ar^3$ is a 4,4'-biphenylylene group (that is, a repeating unit derived from 4,4'-dihydroxybiphenyl, 4-amino-4'-hydroxybiphenyl or 4,4'-diaminobiphenyl) are preferable, and those in which $Ar^3$ is a 4,4'-biphenylylene group are more preferable.

As a monomer forming the repeating unit represented by the general formula (3), 2,6-naphthol, hydroquinone, resorcin or 4,4'-dihydroxybiphenyl can be mentioned, and monomers in which a hydrogen atom of the benzene ring or the naphthalene ring of these compounds is substituted with a halogen atom, an alkyl group having 1 to 10 carbon atoms or an aryl group can also be mentioned. Furthermore, the above-mentioned monomer may be used as an ester-forming derivative to be described later.

The monomer forming the structural unit represented by the above formula (1), (2) or (3) is preferably used as an ester-forming derivative in order to facilitate polymerization in the course of producing a polyester. The term "ester-forming derivative" refers to a monomer having a group that promotes an ester-forming reaction, and specific examples thereof include highly reactive derivatives such as an ester-forming derivative in which a carboxylic acid group in the monomer molecule is converted to an acid halide or an acid anhydride, and an ester-forming derivative in which a hydroxyl group in the monomer molecule is converted to a lower carboxylic acid ester group.

When the total amount of the repeating unit (1), the repeating unit (2) and the repeating unit (3) is 100 mol %, the content of the repeating unit (1) of the liquid crystal polyester is preferably 30 mol % or more, more preferably from 30 mol % or more to 80 mol % or less, still more preferably from 40 mol % or more to 70 mol % or less, and particularly preferably from 45 mol % or more to 65 mol % or less.

When the total amount of the repeating unit (1), the repeating unit (2) and the repeating unit (3) is 100 mol %, the content of the repeating unit (2) of the liquid crystal polyester is preferably 35 mol % or less, more preferably from 10 mol % or more to 35 mol % or less, still more preferably from 15 mol % or more to 30 mol % or less, and particularly preferably from 17.5 mol % or more to 27.5 mol % or less.

When the total amount of the repeating unit (1), the repeating unit (2) and the repeating unit (3) is 100 mol %, the content of the repeating unit (3) of the liquid crystal polyester is preferably 35 mol % or less, more preferably from 10 mol % or more to 35 mol % or less, still more preferably from 15 mol % or more to 30 mol % or less, and particularly preferably from 17.5 mol % or more to 27.5 mol % or less.

That is, in the liquid crystal polyester, when the total amount of the repeating unit (1), the repeating unit (2) and the repeating unit (3) is 100 mol %, it is preferable that the content of the repeating unit (1) is from 30 mol % or more to 80 mol % or less, the content of the repeating unit (2) is from 10 mol % or more to 35 mol % or less, and the content of the repeating unit (3) is from 10 mol % or more to 35 mol % or less.

When the content of the repeating unit (1) in the liquid crystal polyester falls within the above range, it becomes easy to improve the melt fluidity, heat resistance, strength and rigidity.

In the liquid crystal polyester, a ratio of the content of the repeating unit (2) to the content of the repeating unit (3) represented by the formula: [content of the repeating unit (2)]/[content of the repeating unit (3)] (mol/mol) is preferably from 0.9/1 to 1/0.9, more preferably from 0.95/1 to 1/0.95, and still more preferably from 0.98/1 to 1/0.98.

It should be noted that the liquid crystal polyester may have only one type of repeating units (1) to (3) each independently or may have two or more types thereof. Further, the liquid crystal polyester may contain one or more repeating units other than the repeating units (1) to (3), but the content thereof is preferably from 0 mol % or more to 10 mol % or less, and more preferably from 0 mol % or more to 5 mol % or less, with respect to the total amount of all the repeating units.

Since the melt viscosity is likely to be lowered, the liquid crystal polyester preferably has a repeating unit (3) in which X and Y each represent an oxygen atom, that is, has a repeating unit derived from a predetermined aromatic diol, and more preferably only has the repeating unit (3) in which X and Y each represent an oxygen atom.

The liquid crystal polyester is preferably produced by melt polymerization of a raw material monomer corresponding to the repeating unit constituting the liquid crystal polyester and solid phase polymerization of the resulting polymer (prepolymer). As a result, a high molecular weight liquid crystal polyester having high heat resistance and high strength/rigidity can be produced with favorable operability. The melt polymerization may be carried out in the presence of a catalyst, and examples of the catalyst include metal compounds such as magnesium acetate, stannous acetate, tetrabutyl titanate, lead acetate, sodium acetate, potassium acetate and antimony trioxide, and nitrogen-containing heterocyclic compounds such as N,N-dimethylaminopyridine and 1-methylimidazole, and nitrogen-containing heterocyclic compounds are preferred.

The flow starting temperature of the liquid crystal polyester is preferably 270° C. or higher, more preferably from 270° C. or higher to 400° C. or lower, and still more preferably from 280° C. to 380° C. or lower. As the flow starting temperature of the liquid crystal polyester increases, the heat resistance, strength and rigidity are likely to be improved. However, if it is too high, a high temperature is required for melting, and thermal degradation tends to occur during molding, and the viscosity at the time of melting increases to lower the fluidity.

It should be noted that the flow starting temperature which is also referred to as flow temperature or fluidity temperature and serves as an indicator of the molecular weight of a liquid crystal polyester is a temperature at which a viscosity of 4,800 Pa·s (48,000 poise) is exhibited when melting a liquid crystal polyester while raising the temperature at a rate of 4° C./min using a capillary rheometer (for example, a flow tester "CFT-500" manufactured by Shimadzu Corporation) under a load of 9.8 MPa (100 kgf/cm2) and extruding it from a nozzle having an inner diameter of 1 mm and a length of 10 mm (see "Liquid Crystalline Polymer—Synthesis, Molding, and Application—" edited by Naoyuki Koide, p. 95, CMC Publishing Co., Ltd., published on Jun. 5, 1987).

A single type of the liquid crystal polyester may be used alone, or two or more types thereof may be used in combination.

In the present embodiment, the amorphous resin is contained in an amount of 60 parts by mass or more and 100 parts by mass or less in 100 parts by mass of the resin component.

The content of the amorphous resin is preferably from 65 parts by mass or more to 95 parts by mass or less, more preferably from 70 parts by mass or more to 90 parts by mass or less, and particularly preferably from 80 parts by mass or more to 90 parts by mass or less, with respect to 100 parts by mass of the resin component.

Further, when the liquid crystal resin is contained in the resin component, the content of the liquid crystal resin is preferably from more than 0 parts by mass to 40 parts by mass or less, more preferably from 5 parts by mass or more to 30 parts by mass or less, particularly preferably from 5 parts by mass or more to 25 parts by mass or less, and extremely preferably from 10 parts by mass or more to 20 parts by mass or less.

The higher the content of the liquid crystal resin, the easier the melt fluidity of the resin composition is improved. However, when the content of the liquid crystal resin exceeds 40 parts by mass, the MD shrinkage rate of a molded body obtained from the resin composition tends to decrease, whereas the TD shrinkage rate tends to increase. As a result, the ratio of (TD shrinkage rate)/(MD shrinkage rate) tends to easily exceed 1.5. Then, as a result, for example, in a molded body having a cylindrical shape such as an oil control valve, the roundness and irregularity of the cylindrical portion tend to decrease. On the other hand, in the case where the liquid crystal resin is not contained in the resin component, there is a possibility that molding defects such as short shots or the like may occur due to insufficient fluidity of the molten resin at the time of forming a molded body having a thin portion.

In the present embodiment, the content of the resin component is preferably from 40 to 65% by mass, and more preferably from 45 to 60% by mass, with respect to the total mass of the resin composition.

[Fibrous Filler]

The fibrous filler may be an inorganic filler or an organic filler. Examples of the fibrous filler include glass fibers; carbon fibers such as polyacrylonitrile (PAN)-based carbon fibers and pitch-based carbon fibers; ceramic fibers such as silica fibers, alumina fibers, silica and alumina fibers; and metal fibers such as stainless steel fibers. Examples of the glass fibers include those produced by various methods such as chopped glass fibers, milled glass fibers and the like.

In the present embodiment, an inorganic filler is preferable, and a carbon fiber or a glass fiber is more preferable.

In the present specification, the term "fibrous filler" means a filler whose shape is fibrous, and the term "plate-like filler" described later means a filler whose shape is plate-like.

The number average fiber length of the glass fiber after melt-kneading is preferably from 50 μm or more to 500 μm or less. Further, the number average fiber diameter of the glass fiber after melt-kneading is preferably from 6 μm or more to 18 μm or less.

It should be noted that the number average fiber diameter and the number average fiber length of the glass fiber after melt-kneading can be measured by electron microscopic observation.

A single type of the glass filler may be used alone, or two or more types thereof may be used in combination.

The number average fiber diameter of the carbon fiber after melt-kneading is preferably from 5 to 20 μm, and more preferably from 5 to 15 μm. Further, the number average fiber length of the carbon fiber after melt-kneading is preferably from 50 to 500 μm.

In addition, the number average aspect ratio (i.e., (number average fiber length)/(number average fiber diameter)) of the carbon fiber after melt-kneading is preferably from 10 to 200, and more preferably from 20 to 100.

It should be noted that in the present specification, the number average fiber diameter and the number average fiber length of the carbon fiber after melt-kneading can be measured by electron microscopic observation.

In the present embodiment, when a carbon fiber is used as the fibrous filler, the carbon fiber is preferably contained in an amount of 30 parts by mass or more and 80 parts by mass or less, more preferably 30 parts by mass or more and 60 parts by mass or less, and particularly preferably 30 parts by mass or more and 50 parts by mass or less, with respect to 100 parts by mass of the resin component. Further, the content of the carbon fiber may be 33 parts by mass or more and 42 parts by mass or less with respect to 100 parts by mass of the resin component.

In addition, in the present embodiment, when a carbon fiber is used as the fibrous filler, the total content of the fibrous filler and the plate-like filler to be described later is preferably from 50 parts by mass or more to 100 parts by mass or less, more preferably from 55 parts by mass or more to 100 parts by mass or less, and particularly preferably from 60 parts by mass or more to 100 parts by mass or less, with respect to 100 parts by mass of the resin component. At this time, the above fibrous filler may contain a fibrous filler other than the carbon fiber.

Further, as another aspect, in the present embodiment, when a carbon fiber is used as the fibrous filler, the total content of the carbon fiber and the plate-like filler to be described later is preferably from 50 parts by mass or more to 100 parts by mass or less, more preferably from 55 parts by mass or more to 100 parts by mass or less, and particularly preferably from 60 parts by mass or more to 100 parts by mass or less, with respect to 100 parts by mass of the resin component. In addition, the total content of the carbon fiber and the plate-like filler to be described later may be 67 parts by mass or more and 100 parts by mass or less with respect to 100 parts by mass of the resin component.

If the total content of the fibrous filler and the plate-like filler is in the above range, the shrinkage rate in the case of forming a molded body can be suppressed, and furthermore, for example, it is possible to obtain a molded body having high dimensional accuracy in which the roundness and irregularity of the cylindrical portion are excellent, when a molded body having a cylindrical shape such as an oil control valve is formed.

In the present embodiment, when a glass fiber is used as the fibrous filler, the glass fiber is preferably contained in an amount of 40 parts by mass or more and 100 parts by mass or less, more preferably 50 parts by mass or more and 95 parts by mass or less, and particularly preferably 55 parts by mass or more and 90 parts by mass or less, with respect to 100 parts by mass of the resin component. Further, the content of the glass fiber may be 60 parts by mass or more and 89 parts by mass or less with respect to 100 parts by mass of the resin component.

In addition, in the present embodiment, when a glass fiber is used as the fibrous filler, the total content of the fibrous filler and the plate-like filler to be described later is preferably from 50 parts by mass or more to 140 parts by mass or less, more preferably from 80 parts by mass or more to 130 parts by mass or less, and particularly preferably from 90 parts by mass or more to 125 parts by mass or less, with respect to 100 parts by mass of the resin component. At this time, the above fibrous filler may contain a fibrous filler other than the glass fiber.

Further, as another aspect, in the present embodiment, when a glass fiber is used as the fibrous filler, the total content of the glass fiber and the plate-like filler to be described later is preferably from 50 parts by mass or more to 140 parts by mass or less, more preferably from 80 parts by mass or more to 130 parts by mass or less, and particularly preferably from 90 parts by mass or more to 125 parts by mass or less, with respect to 100 parts by mass of the resin component. In addition, the total content of the glass fiber and the plate-like filler to be described later may be 100 parts by mass or more and 122 parts by mass or less with respect to 100 parts by mass of the resin component.

If the total content of the fibrous filler and the plate-like filler is in the above range, the shrinkage rate in the case of forming a molded body can be suppressed, and furthermore, for example, it is possible to obtain a molded body having high dimensional accuracy in which the roundness and irregularity of the cylindrical portion are excellent, when a molded body having a cylindrical shape such as an oil control valve is formed.

[Plate-Like Filler]

Examples of the plate-like filler include talc, mica, scaly graphite, wollastonite, barium sulfate and calcium carbonate. The mica may be muscovite, phlogopite, fluorophlogopite or tetrasilicon mica.

The scaly graphite may be natural scaly graphite or artificial scaly graphite.

A single type of the scaly graphite may be used alone, or two or more types thereof may be used in combination.

It is preferable that the scaly graphite has high fixed carbon content, low ash content such as silicon oxide, and high crystallinity. The volume average particle size of the scaly graphite is preferably from 5 to 100 μm, more preferably from 5 to 80 μm, and still more preferably from 5 to 60 μm. The volume average particle size of the scaly graphite can be measured by a laser diffraction scattering method.

In the present embodiment, the plate-like filler is preferably at least one plate-like filler selected from the group consisting of scaly graphite, talc and mica.

The content of the plate-like filler is 20 parts by mass or more and 80 parts by mass or less, preferably 20 parts by mass or more and 70 parts by mass or less, and more preferably 20 parts by mass or more and 65 parts by mass or less with respect to 100 parts by mass of the resin component. Further, as another aspect, the content of the plate-like filler may be 25 parts by mass or more and 60 parts by mass or less with respect to 100 parts by mass of the resin component.

When the content of the plate-like filler is within the above range, the shrinkage rate of the molded body can be further reduced.

(Other Components)

The resin composition of the present embodiment may contain other components not corresponding to any of amorphous resins, liquid crystal resins, fibrous fillers and plate-like fillers within a range that does not impair the effects of the present embodiment.

Examples of the other components include a filler other than the fibrous filler and the plate-like filler (hereinafter sometimes referred to as "other filler"), an additive, a resin other than the amorphous resin and the liquid crystal resin (hereinafter sometimes referred to as "other resin") and the like.

A single type of the other components may be used alone, or two or more types thereof may be used in combination.

In the case where the resin composition in the present embodiment contains the other filler, the content of the other filler in the resin composition is preferably more than 0 parts by mass and not more than 100 parts by mass with respect to 100 parts by mass of the total content of the resin component.

Examples of the additive include an antioxidant, a thermal stabilizer, an ultraviolet absorber, an antistatic agent, a surfactant, a flame retardant and a colorant.

In the case where the resin composition in the present embodiment contains the additive, the content of the additive of the resin composition is preferably more than 0 parts by mass and not more than 5 parts by mass with respect to 100 parts by mass of the total content of the resin component, the fibrous filler and the plate-like filler.

Examples of the other resin include thermoplastic resins such as polypropylenes, polyamides, polyesters, polyphenylene sulfides, polyether ketones and polyphenylene ethers; and thermosetting resins such as phenol resins, epoxy resins, and cyanate resins.

In the case where the resin composition in the present embodiment contains the other resin, the content of the other resin in the resin composition is preferably more than 0 parts by mass and not more than 20 parts by mass with respect to 100 parts by mass of the total content of the resin component.

The resin composition according to the first embodiment can be produced by mixing the resin component, the fibrous filler, the plate-like filler, and, if required, other components at once or in an appropriate order.

Although the resin compositions of the second embodiment and the third embodiment can be obtained by using the resin composition of the first embodiment, they can be preferably obtained by charging the fibrous filler or the plate-like filler at a later timing when kneading the resin component, the fibrous filler and the plate-like filler. More specifically, when melt-kneading the resin component in order to obtain a molded body, it is desirable to side-feed the fibrous filler or the plate-like filler into the resin component on the downstream side of the extruder as much as possible. It should be noted that at this time, it is desirable to side-feed on the downstream side within the range that does not to impair the dispersibility of the fibrous filler and the plate-like filler in the resin component.

Further, the resin composition of the present embodiment is preferably a pelletized product obtained by melt-kneading an amorphous resin, a liquid crystal resin, a fibrous filler, a plate-like filler, and other components, if required, by using an extruder.

The extruder preferably has a cylinder, one or more screws arranged in the cylinder, and one or more supply ports provided in the cylinder, and more preferably has one or more vent portions provided in the cylinder.

Examples of parts constituted by the molded body formed from the resin composition of the present embodiment include camera module parts; switch parts; motor parts; sensor parts; hard disk drive parts; tableware such as ovenware; automobile parts; battery parts; aircraft parts; sealing members such as a sealing member for a semiconductor element and a sealing member for a coil, and the like.

Among them, automobile parts are preferable, and parts requiring high dimensional stability such as an oil control valve, a solenoid valve, a car air conditioning vane and a turbocharger casing/shroud can be suitably molded as an automobile part.

Another aspect of the resin composition of the present invention is a resin composition containing a resin component, a fibrous filler, and a plate-like filler, wherein the resin component includes an amorphous resin and a liquid crystal resin, the amorphous resin is at least one selected from the group consisting of polyether sulfones, polyetherimides, polysulfones, polyarylates, and modified polyphenylene ethers, preferably a polyether sulfone, and more preferably an aromatic polyether sulfone;

the liquid crystal resin is a liquid crystal polyester, preferably a liquid crystal polyester having at least one repeating unit selected from the group consisting of a repeating unit derived from 6-hydroxy-2-naphthoic acid, a repeating unit derived from p-hydroxybenzoic acid, a repeating unit derived from 2,6-naphthalenedicarboxylic acid, a repeating unit derived from terephthalic acid, a repeating unit derived from isophthalic acid, a repeating unit derived from hydroquinone, and a repeating unit derived from 4,4'-dihydroxybiphenyl; and the fibrous filler is a carbon fiber or a glass fiber;

the plate-like filler is at least one selected from the group consisting of scaly graphite, talc and mica;

the content of the resin component is preferably from 40 to 65% by mass, and more preferably from 45 to 60% by mass, the content of the amorphous resin is from 60 parts by mass or more to 100 parts by mass or less, preferably from 65 parts by mass or more to 95 parts by mass or less, more preferably from 70 parts by mass or more to 90 parts by mass or less, and still more preferably from 80 parts by mass or more and 90 parts by mass or less, with respect to 100 parts by mass of the resin component;

the content of the fibrous filler is from 30 parts by mass or more to 100 parts by mass or less, and preferably from 33 parts by mass or more to 89 parts by mass or less with respect to 100 parts by mass of the resin component;

the content of the plate-like filler is from 20 parts by mass or more to 80 parts by mass or less, preferably from 25 parts by mass or more to 60 parts by mass or less with respect to 100 parts by mass of the resin component; and the total content of the fibrous filler and the plate-like filler is from 50 parts by mass or more to 180 parts by mass or less, preferably from 67 parts by mass or more to 122 parts by mass or less with respect to 100 parts by mass of the resin component.

EXAMPLES

Hereinafter, the present invention will be described in more detail with reference to examples, but the present invention is not limited to the following examples.

Production Example 1

Method for Producing Liquid Crystal Polyester A1

6-hydroxy-2-naphthoic acid (1034.99 g, 5.5 moles), 2,6-naphthalene dicarboxylic acid (378.33 g, 1.75 moles), terephthalic acid (83.07 g, 0.5 moles), hydroquinone (272.52 g, 2.475 moles, 0.225 moles excess with respect to the total amount of 2,6-naphthalenedicarboxylic acid and terephthalic acid), acetic anhydride (1226.87 g, 12 moles), and 1-methylimidazole (0.17 g) as a catalyst were placed in a reaction equipped with a stirrer, a torque meter, a nitrogen gas inlet tube, a thermometer and a reflux condenser, gas in the reactor was replaced with nitrogen gas, and then the temperature was raised from room temperature to 145° C. over 15 minutes while stirring in a nitrogen gas stream and the resulting mixture was refluxed at 145° C. for 1 hour. Subsequently, the temperature was raised from 145° C. to 310° C. over 3.5 hours while distilling off acetic acid as a by-product and unreacted acetic anhydride, and after maintaining the temperature at 310° C. for 3 hours, the contents were taken out and cooled to room temperature. The obtained solid material was pulverized to a particle size of about 0.1 to 1 mm with a pulverizer to obtain a prepolymer in the form of a powder.

Subsequently, the prepolymer was subjected to solid phase polymerization by raising the temperature from room temperature to 250° C. over 1 hour in a nitrogen atmosphere, raising the temperature from 250° C. to 310° C. over 10 hours and maintaining the temperature at 310° C. for 5 hours. After the solid phase polymerization, the resultant was cooled to obtain a liquid crystal polyester A1 in the form of a powder.

The flow starting temperature of this liquid crystal polyester was 324° C.

Production Example 2

Method for Producing Liquid Crystal Polyester A2 p-hydroxybenzoic acid (994.5 g, 7.2 moles), terephthalic acid (299.1 g, 1.8 moles), isophthalic acid (99.7 g, 0.6 moles), 4,4'-dihydroxybiphenyl (446.9 g, 2.4 moles), acetic anhydride (1347.6 g, 13.2 moles) and 0.2 g of 1-methylimidazole were placed in a reactor equipped with a stirrer, a torque meter, a nitrogen gas inlet tube, a thermometer and a reflux condenser, the temperature was raised from room temperature to 150° C. over 30 minutes while stirring in a nitrogen gas stream, and the resulting mixture was refluxed at 150° C. for 1 hour. Subsequently, 0.9 g of 1-methylimidazole was added, the temperature was raised to 320° C. over 2 hours and 50 minutes while distilling off acetic acid as a by-product and unreacted acetic anhydride, and after maintaining the temperature at 320° C. until an increase in torque was observed, the contents were taken out from the reactor and cooled to room temperature. The obtained solid material was pulverized to a particle size of about 0.1 to 1 mm with a pulverizer to obtain a prepolymer in the form of a powder. Subsequently, the prepolymer was subjected to solid phase polymerization by raising the temperature from room temperature to 250° C. over 1 hour in a nitrogen gas atmosphere, raising the temperature from 250° C. to 285° C. over 5 hours and maintaining the temperature at 285° C. for 3 hours, and then the resultant was cooled to obtain a liquid crystal polyester A2 in the form of a powder. The flow starting temperature of this liquid crystal polyester was 327° C.

<Production of Resin Composition>

Examples 1 to 11, Comparative Examples 1 and 2

An aromatic polyether sulfone ("SUMIKAEXCEL (registered trademark) PES 3600P" manufactured by Sumitomo Chemical Co., Ltd.) as an amorphous resin, the liquid crystal polyester A1 or A2 as a liquid crystal resin, a fibrous filler and a plate-like filler were mixed under the conditions shown in Tables 1 and 2. More specifically, a cylinder temperature was set to 340° C. using a twin screw extruder with a side feeder ("PCM-30HS" manufactured by Ikegai Ironworks Corp.) and a water-sealed vacuum pump ("SW-25" manufactured by Shinko Seiki Co., Ltd.), a resin component and a plate-like filler were fed from a main feeder with a screw having a kneading block inserted between a side feeder and a die plate and were melt-kneaded while degassing with a vacuum vent, and then a fibrous filler was further fed from a side feeder and melt-kneaded while degassing with a vacuum vent. The discharged strand was cut to obtain a resin composition in the form of a pellet.

TABLE 1

| | | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|---|
| Resin component | Amorphous resin | PES [83] | PES [83] | PES [90] | PES [90] | PES [90] | PES [90] | PES [100] | PES [100] |
| | Liquid crystal resin | A2 [17] | A1 [17] | A2 [10] | A2 [10] | A2 [10] | A2 [10] | — | — |
| Fibrous filler | | CF [42] | CF [42] | CF [33] | CF [33] | CF [33] | CF [40] | CF [21] | CF [43] |
| Plate-like filler | Scaly graphite | [17] | [17] | [0] | [33] | [0] | [0] | [14] | [0] |
| | Mica | [8] | [8] | [0] | [0] | [33] | [60] | [7] | [0] |
| | Talc | [0] | [0] | [33] | [0] | [0] | [0] | [0] | [0] |
| Total amount of fibrous filler | | [42] | [42] | [33] | [33] | [33] | [40] | [21] | [43] |
| Total amount of plate-like filler | | [25] | [25] | [33] | [33] | [33] | [60] | [21] | [0] |
| Total amount of fibrous filler and plate-like filler | | [67] | [67] | [67] | [67] | [67] | [100] | [42] | [43] |
| Molding shrinkage rate | MD (%) | 0.090 | 0.100 | 0.029 | 0.087 | 0.025 | 0.028 | 0.143 | 0.065 |
| | TD (%) | 0.030 | 0.033 | −0.019 | 0.116 | −0.010 | −0.025 | 0.248 | 0.160 |
| | TD/MD | 0.33 | 0.33 | −0.66 | 1.33 | −0.40 | −0.89 | 1.73 | 2.46 |
| Roundness | P-P (μm) | 12 | 8 | 12 | 14 | 10 | 9 | 19 | 16 |

TABLE 2

| | | Ex. 7 | Ex. 8 | Ex. 9 | Ex. 10 | Ex. 11 |
|---|---|---|---|---|---|---|
| Resin component | Amorphous resin | PES [80] | PES [80] | PES [89] | PES [89] | PES [89] |
| | Liquid crystal resin | A1 [20] | A1 [20] | A2 [11] | A1 [11] | A1 [11] |
| Fibrous filler | | GF [60] | GF [70] | GF [78] | GF [78] | GF [89] |
| Plate-like filler | Scaly graphite | [0] | [0] | [0] | [0] | [0] |
| | Mica | [0] | [0] | [0] | [0] | [0] |
| | Talc | [40] | [30] | [44] | [44] | [33] |
| Total amount of fibrous filler | | [60] | [70] | [78] | [78] | [89] |
| Total amount of plate-like filler | | [40] | [30] | [44] | [44] | [33] |
| Total amount of fibrous filler and plate-like filler | | [100] | [100] | [122] | [122] | [122] |

TABLE 2-continued

|  |  | Ex. 7 | Ex. 8 | Ex. 9 | Ex. 10 | Ex. 11 |
|---|---|---|---|---|---|---|
| Molding | MD (%) | 0.149 | 0.143 | 0.145 | 0.154 | 0.137 |
| shrinkage | TD (%) | 0.086 | 0.063 | 0.046 | 0.048 | 0.036 |
| rate | TD/MD | 0.58 | 0.44 | 0.32 | 0.31 | 0.26 |
| Roundness | P-P (μm) | 11 | 8 | 8 | 8 | 9 |

In the above Tables 1 and 2, the meanings of the respective symbols are as follows. The numerical values in brackets [ ] indicate the amount (in terms of parts by mass) of the component added.

PES: aromatic polyether sulfone ("SUMIKAEXCEL (registered trademark) PES 3600V" manufactured by Sumitomo Chemical Co., Ltd.).

A1, A2: the liquid crystal polyester A1 or A2.

CF: carbon fiber TR03A4M (manufactured by Mitsubishi Rayon Co., Ltd.).

GF: chopped glass fiber CS3J260S (manufactured by Nitto Boseki Co., Ltd.).

Scaly graphite: graphite powder CSP (manufactured by Nippon Graphite Industries Co., Ltd.).

Mica: Mica AB-25S (manufactured by Yamaguchi Mica Co., Ltd.).

Talc: Talc X-50 (manufactured by Nippon Talc Co., Ltd.).

[Measurement of Molding Shrinkage Rate of Molded Body]

The pelletized resin composition obtained above was injection molded using a mold cavity having a cavity of 64 mm (MD)×64 mm (TD)×3 mm to produce a molded body shown in FIG. 1 (L1: approximately 64 mm, L2: approximately 64 mm, L3: approximately 3 mm).

The lengths of the two sides in the MD (L1 and the opposite side of L1 in FIG. 1) were measured, an average value thereof was obtained, and the MD shrinkage rate was calculated from this average value and the average value of the lengths of two sides in MD of the cavity of the mold cavity by the following formula (1). Further, with regard to the obtained molded body, the lengths of two sides in TD (L2 and the opposite side of L2 in FIG. 1) were measured, an average value thereof was obtained, and the TD shrinkage rate was calculated from this average value and the average value of the lengths of two sides in TD of the cavity of the mold cavity by the following formula (2). The results are shown in Tables 1 and 2.

[MD shrinkage rate (%)]=([average value (μm) of lengths of two sides in MD of the cavity of the mold cavity]−[average value (μm) of lengths of two sides in MD of the molded body])/[average value (μm) of lengths of two sides in MD of the cavity of the mold cavity]×100       (1)

[TD shrinkage rate (%)]=([average value (μm) of lengths of two sides in TD of the cavity of the mold cavity]−[average value (μm) of lengths of two sides in TD of the molded body])/[average value (μm) of lengths of two sides in TD of the cavity of the mold cavity]×100       (2)

Furthermore, a ratio (TD shrinkage rate)/(MD shrinkage rate) was calculated and listed in Tables 1 and 2.

[Measurement of Roundness of Molded Body]

Figure 4:
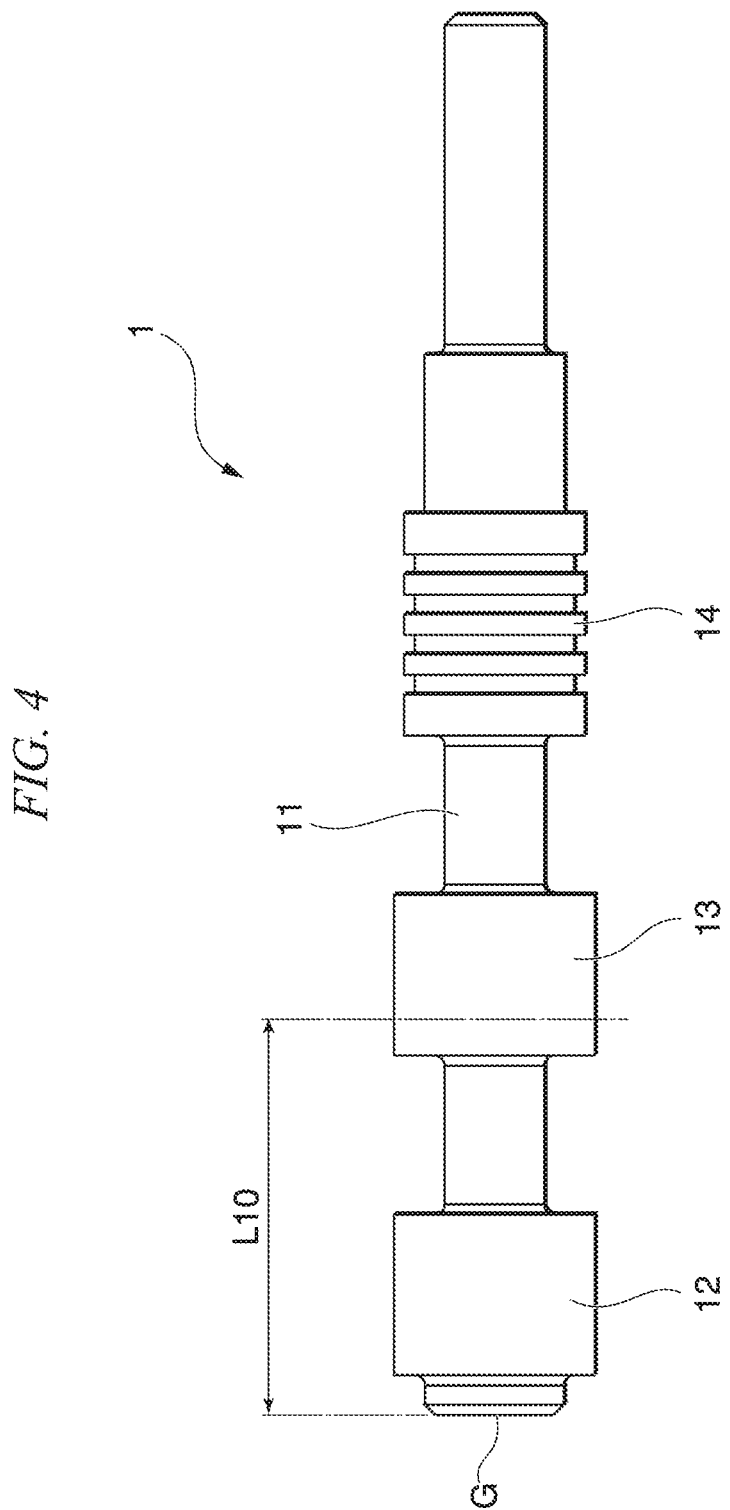
FIG. 4 is a diagram of an oil control valve used for measuring roundness which is formed by using the resin composition of the present invention.

The pelletized resin composition obtained above was injection molded using an oil control valve mold to produce a cylindrical product (oil control valve) shown in FIG. 4. As shown in FIG. 4, an oil control valve 1 (70 mm in total length) has a cylindrical shaft portion 11 in which a first cylindrical portion 12, a second cylindrical portion 13 and a ring portion 14 are provided with intervals from each other, and an end portion on the first cylindrical portion 12 side is a gate portion G. The gate shape is a pin gate (φ1.5 mm).

The roundness around the section orthogonal to an axial direction in the second cylindrical portion 13 which is located at a distance of L10 (20 mm) in the axial direction from the gate portion G of the oil control valve 1 was measured twice with a least square center (LSC) method using a roundness/cylindrical shape measuring machine (RONDCOM 44DX3; JIS 7451: 1997, manufactured by Tokyo Seimitsu Co., Ltd.), and its average value was calculated as a roundness (P-P). It should be noted that in the present specification, the term "roundness (P-P)" means roundness defined in JIS B 0621: 1984 and refers to the magnitude of deviation from the geometrically correct circle (hereinafter referred to as geometric circle) of a circular form. More specifically, when an object of a circular form is sandwiched between two concentric geometric circles, it is the difference between the radii of the two circles in a case where the interval between the two concentric circles is the smallest.

As in the results shown in Tables 1 and 2 above, in each of Examples 1 to 11 to which the present invention was applied, the ratio (TD shrinkage rate)/(MD shrinkage rate) was 1.5 or less and the roundness was 14 or less, and it was possible to produce a molded body excellent in dimensional accuracy (in particular, roundness). On the other hand, in each of Comparative Examples 1 and 2 to which the present invention is not applied, the ratio (TD shrinkage rate)/(MD shrinkage rate) was significantly higher than 1.5, and the dimensional accuracy was not satisfactory. The roundness was also as large as 16 or more and was not satisfactory.

<Production of Resin Composition>

Example 12, Comparative Examples 3 and 4

An aromatic polyether sulfone ("SUMIKAEXCEL (registered trademark) PES 3600P" manufactured by Sumitomo Chemical Co., Ltd.) as an amorphous resin, the liquid crystal polyester A2 as a liquid crystal resin, a fibrous filler and a plate-like filler were mixed under the conditions shown in Table 3. More specifically, a cylinder temperature was set to 340° C. using a twin screw extruder with a side feeder ("PCM-30HS" manufactured by Ikegai Ironworks Corp.) and a water-sealed vacuum pump ("SW-25" manufactured by Shinko Seiki Co., Ltd.), a resin component and a plate-like filler were fed from a main feeder with a screw having a kneading block inserted between a side feeder and a die plate and were melt-kneaded while degassing with a vacuum vent, and then a fibrous filler was further fed from a side feeder and melt-kneaded while degassing with a vacuum vent. The discharged strand was cut to obtain a resin composition in the form of a pellet.

TABLE 3

|  |  | Ex. 12 | Comp. Ex. 3 | Comp. Ex. 4 |
|---|---|---|---|---|
| Resin component | Amorphous resin | PES [83] | PES [100] | PES [100] |
|  | Liquid crystal resin | A2 [17] | — | — |
| Fibrous filler |  | GF [42] | GF [25] | GF [43] |
| Plate-like filler | Scaly graphite | [17] | [0] | [0] |
|  | Mica | [8] | [0] | [0] |
|  | Talc | [0] | [0] | [0] |
| Total amount of fibrous filler |  | [42] | [25] | [43] |
| Total amount of plate-like filler |  | [25] | [0] | [0] |
| Total amount of fibrous filler and plate-like filler |  | [67] | [25] | [43] |
| Molding shrinkage rate | MD (%) | −0.050 | 0.203 | 0.148 |
|  | TD (%) | 0.098 | 0.374 | 0.333 |
|  | TD/MD | 0.05 | 0.58 | 0.48 |
| Roundness | P-P (μm) | 12 | 24 | 27 |

In the above Table 3, the meanings of the respective symbols are as follows. The numerical values in brackets [ ] indicate the amount (in terms of parts by mass) of the component added.

PES: aromatic polyether sulfone ("SUMIKAEXCEL (registered trademark) PES 3600P" manufactured by Sumitomo Chemical Co., Ltd.).

A2: the liquid crystal polyester A2.

CF: carbon fiber TR03A4M (manufactured by Mitsubishi Rayon Co., Ltd.).

GF: chopped glass fiber CS3J260S (manufactured by Nitto Boseki Co., Ltd.).

Scaly graphite: graphite powder CSP (manufactured by Nippon Graphite Industries Co., Ltd.).

Mica: Mica AB-25S (manufactured by Yamaguchi Mica Co., Ltd.).

Talc: Talc X-50 (manufactured by Nippon Talc Co., Ltd.).

[Measurement of Molding Shrinkage Rate of Molded Body]

The pelletized resin compositions of Example 12 and Comparative Examples 3 and 4 obtained above were injection molded using a mold cavity having a cavity of 64 mm (MD)×64 mm (TD)×3 mm, respectively, to produce flat plate-like test pieces (L1: approximately 64 mm, L2: approximately 64 mm, L3: approximately 3 mm) shown in FIGS. 2 and 3.

The lengths in the MD (L5 and L5-2) of the obtained flat plate-like test pieces were measured with a three-dimensional shape measuring apparatus (QVH2X 404-PRO manufactured by Mitutoyo Corporation), an average value thereof was obtained, and the high precision MD shrinkage rate was calculated from this average value and the average value of the lengths in the MD (corresponding to L5 and L5-2) of the mold cavity measured by the three-dimensional shape measuring apparatus by the following formula (4). Further, with regard to the obtained molded body, the lengths in TD (L4 and L4-2) was measured by a three-dimensional shape measuring apparatus, an average value thereof was obtained, and the high-precision TD shrinkage rate was calculated from this average value and the average value of the lengths in the TD (corresponding to L4 and L4-2) of the mold cavity measured by the three-dimensional shape measuring apparatus by the following formula (3). The results are shown in Table 3.

TD molding shrinkage rate (high precision MD shrinkage rate) (%)=([average value of two lengths between the apexes of two square pyramids spaced apart in the TD of the mold cavity]−[average value of two lengths between the apexes of two square pyramids spaced apart in the TD of the molded body])/[average value of two lengths between the apexes of two square pyramids spaced apart in the TD of the mold cavity]×100    (3)

MD molding shrinkage rate (high precision MD shrinkage rate) (%)=([average value of two lengths between the apexes of two square pyramids spaced apart in the MD of the mold cavity]−[average value of two lengths between the apexes of two square pyramids spaced apart in the MD of the molded body])/[average value of two lengths between the apexes of two square pyramids spaced apart in the MD of the mold cavity]×100    (4)

Furthermore, the sum of the high precision TD shrinkage rate and the high precision MD shrinkage rate was calculated and listed in Table 3.

[Measurement of Roundness of Molded Body]

The pelletized resin composition obtained above was injection molded using an oil control valve mold to produce a cylindrical product (oil control valve) shown in FIG. 4, and the roundness was measured in the same manner as described above.

As in the results shown in Table 3 above, in Example 12 to which the present invention was applied, the high precision TD shrinkage rate was as low as 0.1% and the high precision MD shrinkage rate was as low as −0.05%, the roundness (P-P) was also 12 and it was possible to produce a molded article excellent in dimensional accuracy (in particular, roundness). Furthermore, the sum of the high precision TD shrinkage rate and the high precision MD shrinkage rate was also as low as 0.05%.

On the other hand, in each of Comparative Examples 3 and 4 to which the present invention is not applied, the sum of the high precision TD shrinkage rate and the high precision MD shrinkage rate was large, the roundness (P-P) was also as large as 24 or more, and the dimensional accuracy was not satisfactory.

INDUSTRIAL APPLICABILITY

According to the present invention, it is possible to provide a resin composition which is excellent in dimensional accuracy when a molded body is formed, and in particular, when the molded body has a cylindrical portion, is excellent in roundness of the cylindrical portion thereof, and it is therefore useful industrially.

REFERENCE SIGNS LIST

L1: Side of MD
L2: Side of TD
L3: Thickness
G: Gate portion
H1: Height of square pyramid
L4: Length between apexes of two square pyramids spaced apart in TD
L4-2: Opposite side of L4
L5: Length between apexes of two square pyramids spaced apart in MD
L5-2: Opposite side of L5
L6, L7: Sides of bottom surfaces of square pyramids
L8, L9: Distances of base substances from outer peripheries
L10: Distance in axial direction from gate portion G of oil control valve
11: Cylindrical shaft portion
12: First cylindrical portion
13: Second cylindrical portion
14: Ring portion

The invention claimed is:

1. A resin composition comprising:
a resin component including a polyether sulfone amorphous resin and a liquid crystal polyester resin;
a glass fiber; and
a plate-like filler,
wherein,
a content of said plate-like filler is from 20 parts by mass or more to 80 parts by mass or less with respect to 100 parts by mass of said resin component,
a total content of said glass fiber and said plate-like filler is from 50 parts by mass or more to 140 parts by mass or less with respect to 100 parts by mass of said resin component,
a content of said polyether sulfone is from 60 parts by mass or more to 95 parts by mass or less with respect to 100 parts by mass of said resin component,
wherein the plate-like filler is at least one selected from scaly graphite, talc and mica,
a content of the glass fiber is from 40 parts by mass or more to 100 parts by mass or less with respect to 100 parts by mass of the resin component, and
wherein when a molded body is formed using a mold cavity having a cavity of 64 mm (MD)×64 mm (TD)×3 mm (thickness),
a TD molding shrinkage rate obtained from the following formula (1) is 0.23% or less,
an MD molding shrinkage rate obtained from the following formula (2) is 0.15% or less, and
(said TD molding shrinkage rate)/(said MD molding shrinkage rate) is 1.5 or less:

$$TD \text{ molding shrinkage rate } (\%) = ([\text{average value of lengths of two sides in } TD \text{ of the cavity of the mold cavity}] - [\text{average value of lengths of two sides in } TD \text{ of the molded body}])/[\text{average value of lengths of two sides in } TD \text{ of the cavity of the mold cavity}] \times 100 \quad (1)$$

$$MD \text{ molding shrinkage rate } (\%) = ([\text{average value of lengths of two sides in } MD \text{ of the cavity of the mold cavity}] - [\text{average value of lengths of two sides in } MD \text{ of the molded body}])/[\text{average value of lengths of two sides in } MD \text{ of the cavity of the mold cavity}] \times 100 \quad (2).$$

2. The resin composition according to claim 1, wherein said (TD shrinkage rate)/(MD shrinkage rate) is 1.0 or less.

3. The resin composition according to claim 1, which is for molding an automobile part.

4. An oil control valve, a solenoid valve, a car air conditioning vane or a turbocharger casing/shroud formed from the resin composition according to claim 1.

5. A resin composition comprising:
a resin component including a polyether sulfone amorphous resin and a liquid crystal polyester resin;
a glass fiber; and
a plate-like filler,
wherein
a content of said plate-like filler is from 20 parts by mass or more to 80 parts by mass or less with respect to 100 parts by mass of said resin component,
a total content of said glass fiber and said plate-like filler is from 50 parts by mass or more to 140 parts by mass or less with respect to 100 parts by mass of said resin component,
a content of said polyether sulfone is from 60 parts by mass or more to 95 parts by mass or less with respect to 100 parts by mass of said resin component,
wherein the plate-like filler is at least one selected from scaly graphite, talc and mica,
a content of the glass fiber is from 40 parts by mass or more to 100 parts by mass or less with respect to 100 parts by mass of the resin component, and
wherein when a molded body is formed using a mold cavity under the following conditions,
a TD molding shrinkage rate obtained from the following formula (3) is from 0.02% or more to 0.20% or less,
an MD molding shrinkage rate obtained from the following formula (4) is from −0.05% or more to 0.05% or less,
a sum of said MD molding shrinkage rate and said TD molding shrinkage rate is 0.25% or less:
(conditions)
mold cavity: includes, in a base substance of 64 mm (MD)×64 mm (TD)×3 mm (thickness), a cavity having a shape in which four square pyramids are attached so that apexes overlap corners of an imaginary square of 50 mm×50 mm in plan view which are assumed to be 7 mm inside from an outer periphery of said base substance;
said square pyramid: 2 mm×2 mm (bottom surface), 0.2 mm (height)

$$TD \text{ molding shrinkage rate } (\%) = ([\text{average value of two lengths between apexes of two square pyramids spaced apart in } TD \text{ of the mold cavity}] - [\text{average value of two lengths between apexes of two square pyramids spaced apart in } TD \text{ of the molded body}])/[\text{average value of two lengths between apexes of two square pyramids spaced apart in } TD \text{ of the mold cavity}] \times 100 \quad (3)$$

$$MD \text{ molding shrinkage rate } (\%) = ([\text{average value of two lengths between apexes of two square pyramids spaced apart in } MD \text{ of the mold cavity}] - [\text{average value of two lengths between apexes of two square pyramids spaced apart in } MD \text{ of the molded body}])/[\text{average value of two lengths between apexes of two square pyramids spaced apart in } MD \text{ of the mold cavity}] \times 100 \quad (4).$$

6. The resin composition according to claim 5, wherein the sum of said MD molding shrinkage rate and said TD molding shrinkage rate is 0.15% or less.

* * * * *